April 10, 1962 HARUKI TOMONOH ET AL 3,029,367

DEVICE FOR ASSEMBLING THE CIRCUITS ELEMENTS

Filed July 9, 1959

3,029,367

DEVICE FOR ASSEMBLING THE CIRCUITS ELEMENTS

Haruki Tomonoh, 184 2-chome Tamagawayoga Setagaya-ku, Tokyo, Japan, and Toshihiko Teshirogi, 996 Kamikodanaka, Kawasaki, Japan Filed July 9, 1959, Ser. No. 826,029
1 Claim. (Cl. 317—101)

Figure 1:
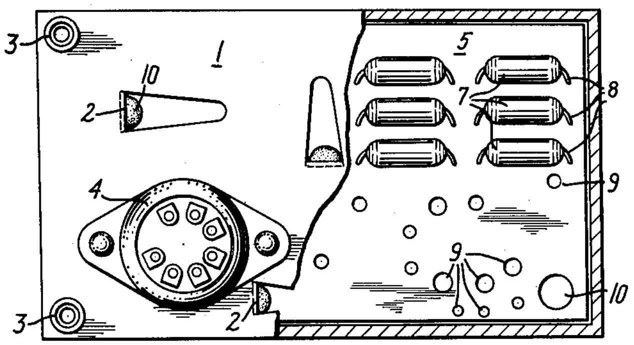

In the communication equipments such as radio and television receivers, various circuit elements of resistors, condensers, coils, vacuum tubes, etc. are used in large numbers, but it is advantageous that these circuits elements should be composed as a single body reduced in size as much as possible in order to simplify the manufacturing process, inspections, and testing works of equipments.

The present invention is proposing an advantageous device for assembling body of such circuit elements especially including vacuum tubes as a single unit.

This invention is characterized by that the mounting plate supporting many circuit elements and print wiring on its outer face has the punched holes corresponding to the leading legs or fitting legs for the tube sockets and other parts arranged on the outer face of the chassis, and after these circuit elements are mounted on one side of the plate, it is inserted under the chassis in such a way that the elements will be located inside, and in this case the leading or fitting legs for the tubes and other parts are inserted into the aforesaid holes on the plate; thus the circuit elements are fixed by being soldered to the print wiring on the outer face of the mounting plate.

Consequently, according to the present invention, first of all, as many circuit elements, especially those of small size, are mounted on the plate in advance, the working is simplified, and since the connection for the tube sockets, the wiring work of which has been extremely complicated in the sets used up till now, is carried out on the outside face of the mounting plate via print wiring on it as is the case with other circuit elements, the wiring work of the whole set can be conducted very easily and yet securely. The mounting plate itself supporting the circuit elements on its inner face, after it is inserted under the chassis, can also be mounted on the chassis by making use of the print wiring on its outside face. That is, the mounting legs made by the shear and form are prepared on the chassis in advance in order to fix the mounting plate on it, and the tips of these mounting legs are inserted into the corresponding holes on the plate as in the case of the leading legs of circuit elements, they are soldered to the print wiring on the outside face of the mounting plate. By such process the mounting plate can be fixed on the chassis in a mechanically solid state, and besides an electrically solid earth connection can be effected simultaneously. This is important, because the earth connection has a considerable significance especially in high frequency equipments. Furthermore, the composition of the mounting plate supporting the circuit elements on its inner face has also an important significance in that it is protecting these elements against damages from outside.

The device related to the present invention is extremely reduced in its dimensions as a whole by arranging the majority of many circuit elements between chassis and mounting plate, and especially the chassis thickness is reduced and its structure can be tolerated with a simple one. However, this characteristic of the present invention is more advantageous, when the device related to it is combined with another part such as the rotary switch. Then the composition that all the print wiring is concentrated on the outer face of the mounting plate shows a great advantage for the electric connection with other parts to be combined.

Figure 2:
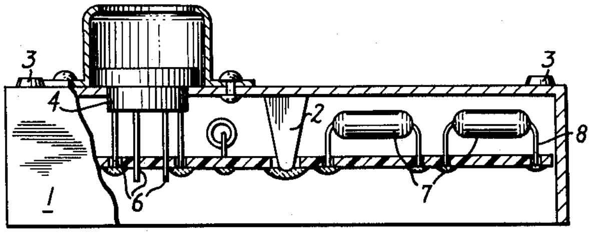
Figures 3, 4:
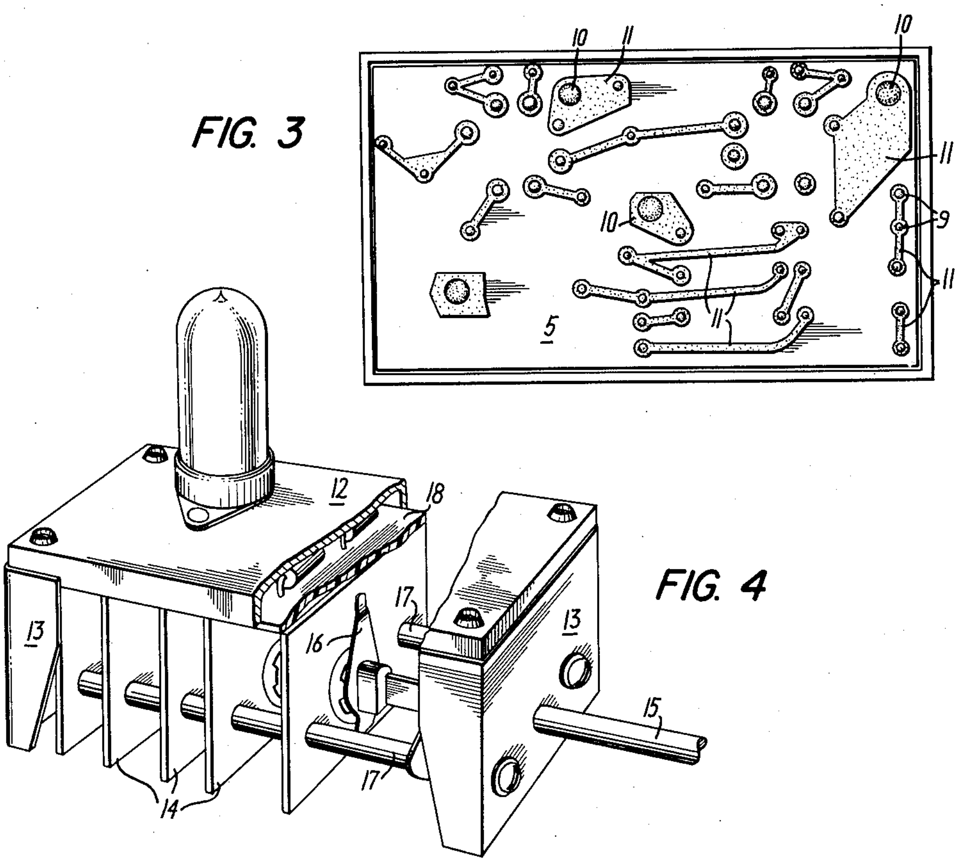

Following the illustrations, the details of the present invention will be described hereunder:

FIGS. 1, 2, 3, show the top view, side view, and bottom view, respectively, of a practical example applying the device related to the present invention.

Chassis 1 is composed by bending a metal plate, and has a plural number of fitting legs 2 made by bending the chassis with the use of a stamper and screw holes 3 for fixing the chassis itself on a larger mounting wall. On the top face of chassis 1 are arranged, for instance, the tube socket 4 and other circuit elements demanding adjustments or those with larger outer diameter, although these are not shown explicitly in the figures.

Mounting plate 5 is made by an insulating plate of synthetic resin, and has the punched holes 9 corresponding to the leading legs 6 of the tube socket 4 and those 8 of other circuit elements of smaller size or the holes 10 corresponding to the mounting legs 8 prepared on the chassis. Out of the circuit elements to be combined in the chassis those 7 except the tube and other special ones are all supported inside the mounting plate 5 via the leading legs 8.

On the outside face (FIG. 3) of the mounting plate 5 the connected circuit for all the circuit elements to be arranged in this unit are provided as the print wiring 11. The tips of leading legs of all the circuit elements, such as leading legs 8 of circuit elements of smaller size supported inside the mounting plate 5, or those 6 of the tube socket 4 arranged on the top face of the chassis 1 are penetrated outward corresponding punched holes 9 of the mounting plate 5 and then soldered to be connected to the print wiring 11 at these tips. And the fitting legs 2 are also penetrated outward through the corresponding punched holes 10 of the mounting plate 5, and are soldered to the print wiring in the similar way as before, thus holding mechanically the mounting plate 5 and at the same time completes earth connection.

The assembling device for circuit elements related to the present invention is extremely reduced in its dimensions as a whole, and has the advantage of facilitating considerably the connection work for circuit elements, especially that for the elements such as tube socket etc. and arranged on the chassis. FIG. 4 shows a practical example of the tuner composed by combining the device related to the present invention with a rotary switch. Moreover, for the purpose of simplifying the drawing various parts attached to the rotary switch, circuit elements to be arranged on the top face of the chassis, and other parts have been omitted altogether.

Here the chassis 12 has the long legs 13 on both ends, by which it is playing as the holder for the rotary switch. The rotary switch is composed as practised usually by a plural number of terminal plates 14, sliding contact maker 16 fixed to the rotary axis 15, and is fixed to the legs 13 of the chassis 12 with screws at both ends of its 2 supporting bars. Although each terminal of the rotary switch is not shown in the figure, it is connected by being soldered respectively to the print wiring on the mounting plate 18 which is inserted under the chassis 12. This connection can be carried through favourably, as the print wiring on the mounting plate 18 is given on its outside face; if the terminal plate 14 can also be made by means of printing technique, it will be conducted far more favourably.

In the tuner of such composition, many circuit elements to be arranged in it are small-sized and yet they can be protected by the chassis and the mounting plate, and the assembly can be constructed as a simple single unit; at the same time, the terminals attached to the rotary switch and the circuit elements mounted on the mounting plate or the chassis can be connected together simply and yet securely via the print wiring arranged on the outer face of the mounting plate.

Consequently the tuner composed in such a way as mentioned above can be made extremely small-sized and simplified from the standpoint of the composition of the whole assembly, and the assembling or adjusting works of the tuner are considerably facilitated.

What we claim is:

An electrical circuit assembly comprising, in combination, a chassis having an open side opposite the underside of the chassis providing access to underneath the chassis and having plug-in elements fixed thereon for mounting electrical components therein with terminals projecting underneath of said chassis, a printed circuit panel attached underneath of said chassis, said printed circuit panel having apertures and conductors extending from selected ones of said apertures, said printed circuit conductors being disposed on a face surface of the panel farthest removed from said chassis facing said open side of the chassis, electrical components mounted between said panel and said chassis on said panel on a face surface opposite to the first-mentioned face surface thereof, the last-mentioned electrical components having terminal conductors received by selected ones of said apertures joined by said circuit conductors, projections on said chassis integral therewith comprising lugs stamped from said chassis bent and extending in a direction toward said panel for attaching said panel to the chassis, said panel having selected ones of said apertures disposed for receiving corresponding ones of said lugs for mounting said panel facing said chassis and some of said apertures joined by said circuit being disposed for receiving corresponding ones of the first-mentioned terminals, providing electrical connection between the printed circuit and plug-in components, the length of said lugs being so chosen that they extend through the corresponding apertures in said panel and hold the panel so that the first-mentioned terminals extend through corresponding apertures, and solder connections on a common face of the panel comprising the face on which the printed circuit is disposed for effecting electrical connections between said terminal conductors and the printed circuit conductors, and solder connections disposed on said common face for mechanically attaching the panel to said lugs.

References Cited in the file of this patent

UNITED STATES PATENTS

| | | |
|---|---|---|
| 2,474,988 | Sargrove | July 5, 1949 |
| 2,492,236 | Mydlil | Dec. 27, 1949 |
| 2,508,030 | Karns | May 16, 1950 |
| 2,733,320 | Herterick | Jan. 31, 1956 |
| 2,756,485 | Abramson | July 31, 1956 |
| 2,876,391 | Sanders | Mar. 3, 1959 |
| 2,916,805 | Plesser | Dec. 15, 1959 |

OTHER REFERENCES

Miller et al.: Electrical Manufacturing, February 1957, pages 124–129.